(12) United States Patent
Hong

(10) Patent No.: US 7,640,042 B2
(45) Date of Patent: Dec. 29, 2009

(54) BUCKLE PHONE

(76) Inventor: Jong Hee Hong, 104 Dong, 1306 ho, Towoldaedong Apt., Sangnam-dong, Changwon city, Kyungsangnam-do 641-777 (KR)

(*) Notice: Subject to any disclaimer, the term of this patent is extended or adjusted under 35 U.S.C. 154(b) by 441 days.

(21) Appl. No.: 10/579,827

(22) PCT Filed: Oct. 20, 2004

(86) PCT No.: PCT/KR2004/002687

§ 371 (c)(1),
(2), (4) Date: May 17, 2006

(87) PCT Pub. No.: WO2005/050856

PCT Pub. Date: Jun. 2, 2005

(65) Prior Publication Data

US 2007/0149264 A1    Jun. 28, 2007

(30) Foreign Application Priority Data

Nov. 20, 2003    (KR) .................. 20-2003-0036216 U

(51) Int. Cl.
*H04M 1/00* (2006.01)
(52) U.S. Cl. .................... 455/575.1; 455/568; 455/569; 455/575.6
(58) Field of Classification Search ................ 455/575.1
See application file for complete search history.

(56) References Cited

U.S. PATENT DOCUMENTS

| 2001/0035444 A1* | 11/2001 | Alis ........................... 224/250 |
| 2002/0193151 A1* | 12/2002 | Edreich ....................... 455/569 |
| 2003/0003969 A1* | 1/2003 | Tong et al. ................... 455/568 |
| 2004/0209657 A1* | 10/2004 | Ghassabian ............... 455/575.1 |

* cited by examiner

*Primary Examiner*—Yuwen Pan
*Assistant Examiner*—Ajibola Akinyemi
(74) *Attorney, Agent, or Firm*—Rabin & Berdo, PC

(57) ABSTRACT

A buckle-phone coupled with a belt, comprising: a mobile phone bent in the length direction of the belt to correspond to a user's waist size; a mobile phone support bent to correspond to the mobile phone and including a mobile phone accommodating section for attachably and detachably supporting the mobile phone the side of the mobile phone being coupled with the side of the belt; an earphone assembly electrically connected to the mobile phone installed in the mobile phone support, and including earphones, a microphone, and an earphone wire connected with the mobile phone support, the earphones, and the microphone; an earphone accommodating section provided at the mobile phone support and accommodating the earphone assembly; and a buckle provided at the other side of the mobile phone support and coupled with the other side of the belt so as to adjust the belt length to correspond to the user's waist size. As described above, the buckle-phone according to the present invention serves as a buckle and a mobile phone, easily keeps earphones, and easily adjusts the length of a belt to be suited to a user waist size.

1 Claim, 4 Drawing Sheets

[Fig. 1]
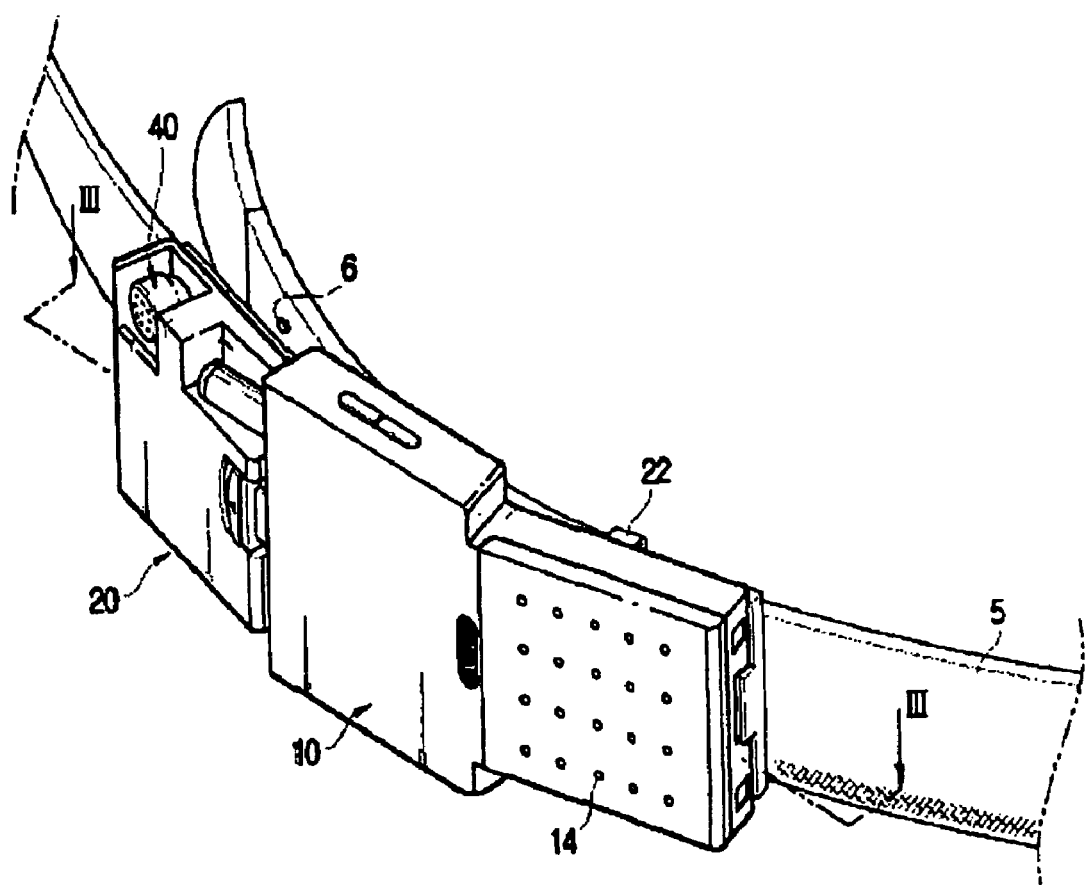

[Fig. 2]
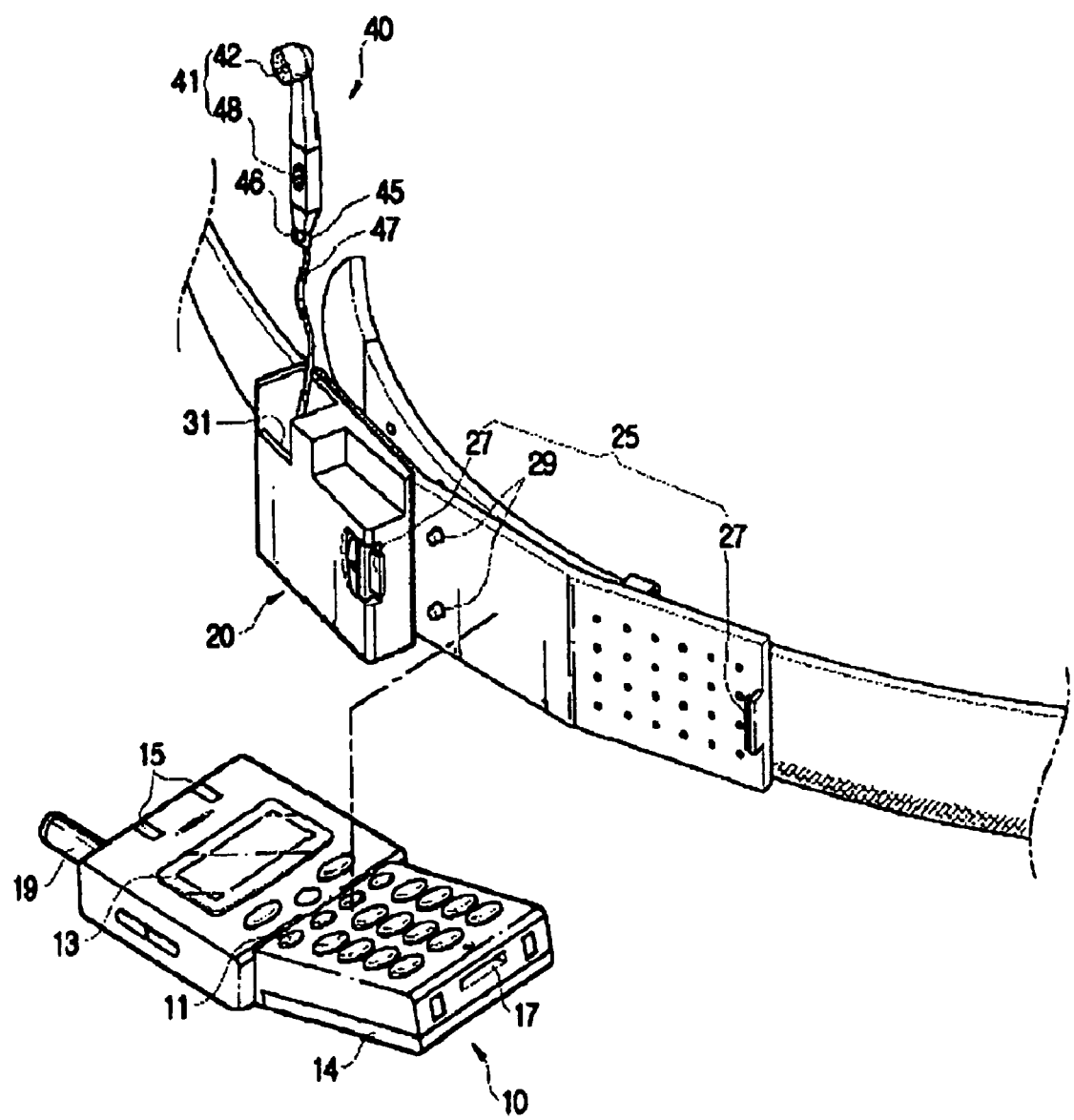

[Fig. 3]
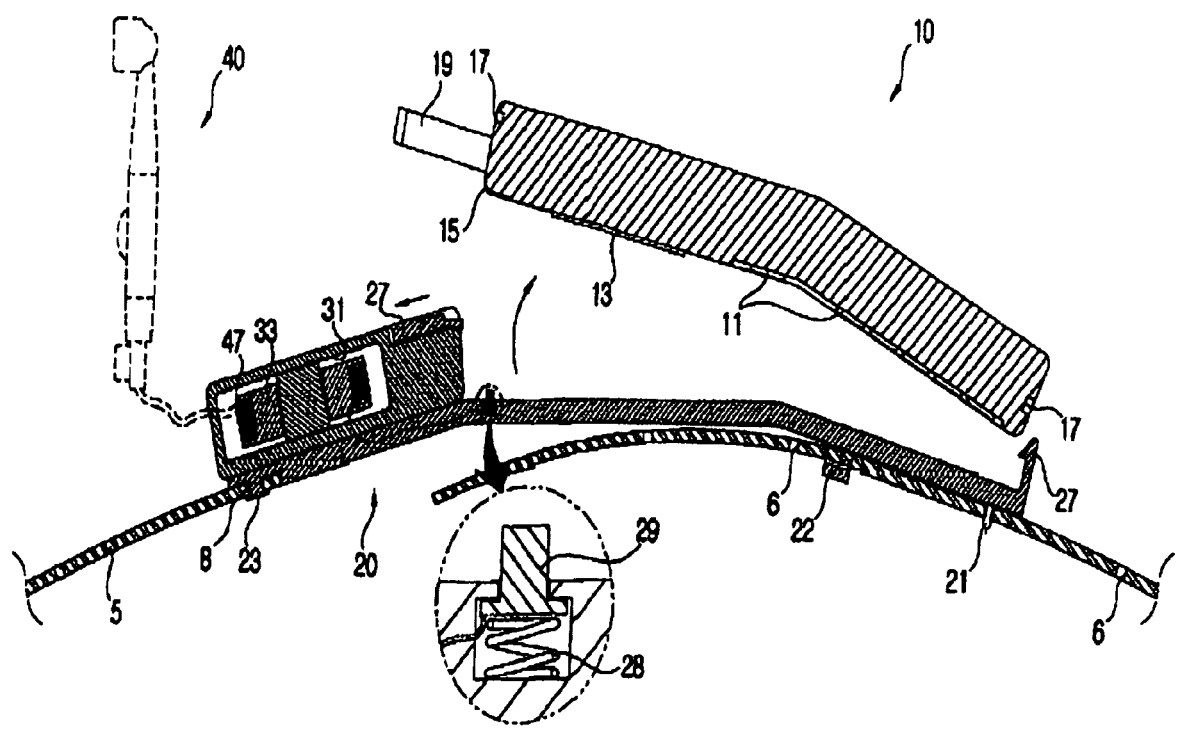

[Fig. 4]
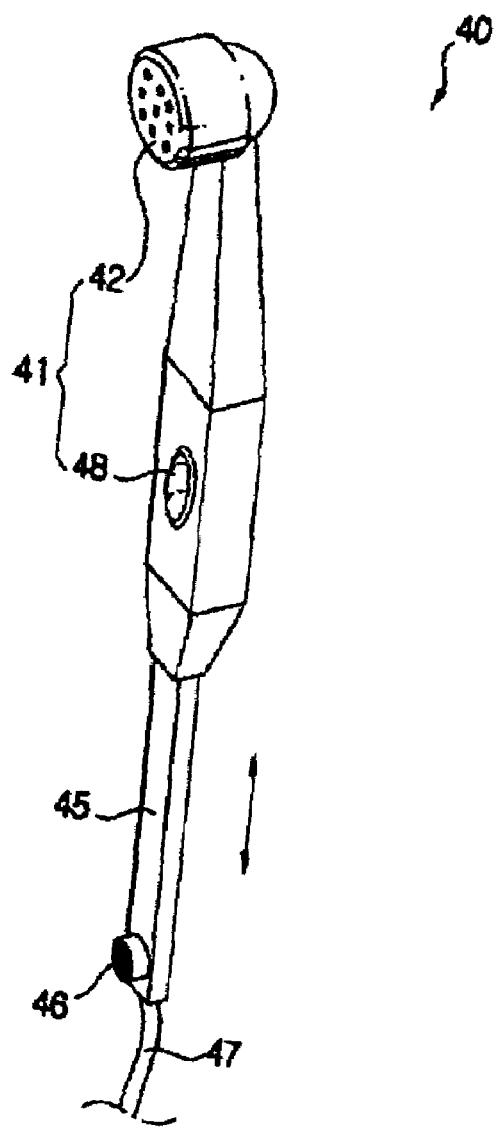

BUCKLE PHONE

BACKGROUND OF THE INVENTION

1. Field of the Invention

The present invention relates to a bucklephone, and more particularly to a buckle-phone including a buckle of a belt to be worn around the waist of a user and a mobile phone.

2. Description of the Related Art

In general, different from a wired telephone using a wired communication network, a mobile phone uses a wireless communication network so that it may be carried by a user. Recently, mobile phones are being supplemented with a function for using the Internet using the wireless communication network.

Meanwhile this conventional mobile phone is capable of being coupled with a belt, it is not easy to adjust the length of the belt so as to easily adjust the conventional mobile phone for various users. Since the conventional mobile phone is provided with the earphones, but is not provided with a device for keeping the earphones, the conventional mobile phone is in-convenient to use.

SUMMARY OF THE INVENTION

Therefore, the present invention has been made in view of the above problems of the conventional mobile phone invented by the inventor of this application, and it is an object of the present invention to provide a bucklephone which serves as a buckle and a mobile phone, the length of a belt is easily adjusted, and earphones are easily accommodated.

In accordance with an aspect of the present invention, the above and other objects can be accomplished by the provision of a buckle-phone coupled with a belt, including a mobile phone bent in the length direction of the belt to correspond to a user waist size, a mobile phone support bent to correspond to the mobile phone and having a mobile phone accommodating section for attachably and detachably supporting the mobile phone, the side of the mobile phone being coupled with the side of the belt, an earphone assembly electrically connected to the mobile phone installed in the mobile phone support, and having earphones, a microphone, and an earphone wire connected with the mobile phone support, the earphones, and the microphone, an earphone accommodating section provided at the mobile phone support and accommodating the earphone assembly, and a buckle provided at the other side of the mobile phone support and coupled with the other side of the belt so as to adjust the belt length to correspond to the user waist size.

Preferably, the earphone assembly includes an earphone main body installed with the earphones, and a microphone installing section installed with the microphone and extendably coupled with the earphone main body.

The earphone accommodating section includes the earphone main body and the microphone installing section, and comprises an elastic reel for winding the earphone wire to be elastically withdrawn.

The buckle-phone further includes a signal terminal provided at the mobile phone for making contact with the mobile phone support so as to enable communication terminal Contact protrusions in which one of the terminal contact protrusions is protruded from the mobile phone accommodating section so as to make contact with the signal terminal, and the other one of the terminal contact protrusions is provided at the inside of the mobile phone accommodating section and is connected with the earphone assembly, and elastic members coupled to the other one of the terminal contact protrusions and enabling the terminal contact protrusions to elastically push out the signal terminal.

The buckle-phone further includes hook coupling sections provided at sides of the mobile phone, and hooks provided at the mobile phone accommodating section and coupled with and released from the hook coupling sections.

BRIEF DESCRIPTION OF THE DRAWINGS

The above and other objects, features and other advantages of the present invention will be more clearly understood from the following detailed description taken in conjunction with the accompanying drawings, in which:

FIG. 1 is a perspective view illustrating a bucklephone according to the present invention assembled with a belt;

FIG. 2 is a perspective view illustrating a mobile phone separated from the buckle-phone in FIG. 1;

FIG. 3 is a cross-sectional view taken along the line III-III in FIG. 1; and

FIG. 4 is a perspective view illustrating use of earphones provided to the buckle-phone in FIG. 2.

DETAILED DESCRIPTION OF THE INVENTION

Hereinafter, a buckle-phone according to the present invention will be described in detail in conjunction with the accompanying drawings.

As shown in FIGS. 1 to 4, a buckle-phone 1 according to the present invention is associated with a belt 5 to be worn around a user waist, and serves as a buckle, i.e. a connecting device of the belt 5. In other words, the bucklephone 1 includes a mobile phone 10 bent in a length direction to correspond to the user waist size, a mobile phone support 20 having a mobile phone support 20 bent to correspond to the mobile phone 10 and attachably and detachably supporting the mobile phone 10, an earphone assembly 40 electrically connected to the mobile phone 10 in the mobile phone support 20, and an earphone accommodating section 31 formed to accommodate the earphone assembly 40 in the mobile phone support 20.

The belt 5 is preferably made of leather, or the like, and longer than the user's waist size. The belt 5 is formed with a connecting hole 8 at the side of the belt 5 where a connecting pin 23 is inserted so as install the mobile phone support 20. The belt 5 is also provided with a plurality of buckle receiving holes 6 at the other side thereof where a buckle section 21 of the mobile phone 20, described later is selectively connected, so that the length of the belt 5 is adjusted by a buckle section 21 of the mobile phone support 20. The other side of the belt 5 may be selectively coupled to the buckle section 21, may have no configuration depending to the configuration of the buckle section 21, or may be provided with a plurality of slits depressed in a direction perpendicular to the length direction of the belt 5, so that the belt 5 is pressed by the buckle section 21 so as to prevent sliding between the belt 5 and the buckle section 21.

The mobile phone 10 is a portable telephone for communicating with an opposite party using the wireless communication network, and is often called a mobile phone or a cellular phone. The mobile phone 10 is connected to the Internet via the wireless communication network. The mobile phone 10 includes a plurality of buttons 11 for inputting a telephone number, a liquid crystal display (LCD) for confirming the inputted telephone number, and an antenna 19 provided for wireless communication. The mobile phone 10 is also provided with a battery 14 for supplying electric power. Preferably, the battery 14 is attached to the rear side of the side where the LCD 13 and the buttons 11 are provided. In order to protect the LCD 13 and the buttons 11, the side of the mobile phone 10, where the LCD 13 and the buttons 11 are provided, is bent to come in contact with a mobile phone accommodating section 25. The mobile phone 10 further includes a signal terminal 15 for receiving and transmitting a communication signal so as to electrically connect earphones 42 installed in the mobile phone support 20. The mobile phone 10 is preferably provided with hook coupling sections 17 in which later-described hooks 27 provided at the mobile phone support 20 are coupled. The mobile phone 10 has a width of the side thereof provided with the LCD 13 wider than a width of the other side thereof provided with the battery 14 and a width of the earphone accommodating section 31. In other words, since the side of the mobile phone 10 provided with the LCD 13 is located at the central portion of the buckle phone 1 where the mobile phone 10 is coupled with the mobile phone support 20, the side of the mobile phone 10 is slightly larger than the other side of the mobile phone 10 and the earphone accommodating section 31 so as to provide an aesthetically pleasing appearance to the buckle phone 1.

The signal terminal 15 is preferably provided with a pair of signal terminals 15 at the side of the mobile phone 10, but may be single signal terminal or more than three signal terminals.

The hook coupling sections 17 are preferably provided at one side and the other side of the mobile phone 10. The hook coupling sections 17 are depressed so that hooks 27 are inserted into the hook coupling sections 17, respectively.

The side of the mobile phone support 20 is coupled with the side of the belt 5, and the other side of the mobile phone support 20 is provided with the buckle 21 which is coupled with the other side of the belt 5 corresponding to the user's waist size so as to adjust the length of the belt 5. The buckle 21 is provided at the other side of the mobile phone support 20, so that the buckle 21 is selectively coupled with the buckle receiving holes formed at the other side of the belt 5. The mobile phone support 20 has a belt support 22 for supporting the other side of the belt 5 couple with the buckle 21.

The buckle 21 is preferably protruded so as to be selectively coupled with one of the buckle receiving holes 6 formed at the other side of the belt 5. However, the buckle 21 presses and releases the other side of the belt 5 by being pivoted about an axis line perpendicular to the length direction of the belt 5, so that the buckle 21 is coupled with the belt 5 and the length of the belt 5 is adjusted.

The earphone assembly 40 includes an earphone main body 42 having earphones 42, and a microphone installing section 45 extendably coupled with the earphone main body 41. The earphone assembly 40 further includes a manipulation button 48 for starting and stopping call. The manipulation button 48 is preferably provided at the earphone main body 41.

The earphone main body 41 is installed with earphones 42 at the side thereof, and the other side thereof is extended so as to accommodate the microphone installing section 45.

The microphone installing section 45 is slightly thinner than the earphone main body 41 so as to be inserted into the earphone main body 41, and the end of the microphone installing section 45 is installed with a microphone 46. Thus, the user inserts the earphones 42 into his/her ears and withdraws the microphone installing section 45 from the earphone main body 41 so as to bring the microphone 46 close to his/her mouth. When accommodating the earphone assembly 40 in the earphone accommodating section 31, the microphone installing section 45 is inserted into the earphone main body 41 so as to shorten the length of a wire of the earphones 42.

The earphone wire 47 is connected with the earphones 42 and the microphone 46 at the side thereof, and the other side of the earphone wire 47 is connected with the earphone accommodating section 31. The other side of the earphone wire 47 is wound around an elastic reel 33 of the earphone accommodating section 31 described later and connected with a terminal contact protrusion 29 of the mobile phone support 20.

The earphone accommodating section 31 is preferably provided at the front side of the side of the mobile phone support 20. The earphone accommodating section 31 can accommodate the earphone main body 41 and the microphone installing section 45, and includes the elastic reel 33 for winding the earphone wire 47 to be elastically withdrawn therefrom. When the earphone main body 41 and the microphone installing section 45 are accommodated in the earphone accommodating section 31, it is preferable that the microphone installing section 45 is inserted into the earphone main body 41.

The elastic reel 33 is provided to wind the earphone wire 47 using elastic force. In other words, the user must hold and pull the earphones 42 while overcoming the elastic force of the elastic reel 33 when they wish to use the earphones 42. When finished using the earphones 42, the user releases the earphones 42, so that the earphone wire 47 is wound around the elastic reel 33 again by the elastic force of the elastic reel 33.

The mobile phone 25 is provided with terminal contact protrusions 29. One of the terminal contact protrusions 29 is protruded from the mobile phone accommodating section 25 to make contact with the signal terminal 15 of the mobile phone. The other one of the terminal contact protrusions 29 is provided at the inside of the mobile phone accommodating section 25 and electrically connected to the earphone wire 47 of the earphone assembly 40. The mobile phone accommodating section 25 further includes the hooks 27, which are provided at the mobile phone accommodating section 25 so as to be coupled with and uncoupled from the hook coupling sections 17.

The terminal contact protrusions 29 further include elastic members coupled with the other one of the terminal contact protrusions 29. The elastic members are pressed by the signal terminal 15 and inserted into the mobile phone accommodating section 25, when the mobile phone 10 is coupled with the mobile phone accommodating section 25. Meanwhile the elastic members elastically push the signal terminal 15 so as to withdraw the signal terminal 15 when the mobile phone 10 is released from the mobile phone accommodating section 25.

The elastic members preferably include coil springs 28 that are provided inside of the mobile phone accommodating section 25 so as to push the other one of the terminal contact protrusions 29 outward. However, the elastic members may includes a rubber, or other shaped spring for elastically pushing the terminal contact protrusions out of the mobile phone accommodating section 25.

The hooks 27 are preferably provided at the sides of the mobile phone accommodating section 25. The hooks 27 are inserted into the hook coupling sections 17 of the mobile phone 10 and are protruded from the mobile phone accommodating section 25 so as to prevent the mobile phone 10 from being released from the mobile phone accommodating section 25. Preferably, one of the hooks 27 has the ability to move elastically. When the user wishes to release the mobile phone 10 coupled with the mobile phone accommodating section 25, the user releases the movable hooks 27 from the hook coupling sections 17 using a predetermined force. Hereinafter, operation of the buckle-phone 1 according to the present invention will be described as follows.

First, the user wraps the belt 5 around his/her waist, and selectively couples the buckle 21 in one of the buckle receiving holes 6 formed at the belt 5. When a call is coming in the state that the mobile phone 10 is installed to the mobile phone support 20, the user can answer the call by releasing the mobile phone 10 from the mobile phone accommodating section 25. At that time, when releasing the movable hooks 27 provide at the mobile phone accommodating section 25 from the hook coupling section 17 of the mobile phone 10, the terminal contact protrusions 29 elastically push the mobile phone 10 outward, so that the mobile phone 10 can be easily released.

When the call is finished and the mobile phone 10 is pressed into the mobile phone accommodating section 25, the hooks 27 are inserted into the hook coupling sections 17 of the mobile phone 10 by the elastic force and the coupling of the mobile phone 10 is completed. Meanwhile, the user can answer a call by withdrawing the earphone assembly 40 from the earphone accommodating section 31, even in the state that the mobile phone 10 is installed to the mobile phone accommodating section 25. When the call is finished, the earphone assembly 40 is easily accommodated in the earphone accommodating section 31 by the elastic force of the elastic reel 33.

As described above, the buckle-phone 1 according to the present invention is provided with the earphone accommodating section such that the earphone assembly 40 is accommodated in the mobile phone support 20. The side of the mobile phone support 20 is coupled with the side of the belt 5, and the other side of the mobile phone support 20 is provided with the buckle 21 which is selectively coupled in the buckle receiving holes 6 formed at the other side of the belt 5, so that the bucklephone 1 can serve as a buckle and a mobile phone. Moreover, the buckle-phone 1 according to the present invention can easily accommodate the earphone assembly 40 and the belt 5 can be wound around the user waist by being adjusted in length. Since the mobile phone accommodating section 25 is elastically provided with the terminal contact protrusions 29 so that the mobile phone 10 can be easily separated from the mobile phone accommodating section 25.

Although the preferred embodiments of the present invention have been disclosed for illustrative purposes, those skilled in the art will appreciate that various modification, additions and substitutions are possible, without departing from the scope and spirit of the invention as disclosed in the accompanying claims.

As described above, the buckle-phone according to the present invention serves as a buckle and a mobile phone, easily keeps earphones, and easily adjusts the length of a belt to be suited to a user waist size.

Moreover, the terminal contact protrusions are elastically provided at the mobile phone accommodating section, so that the mobile phone can be easily separated from the mobile phone accommodating section.

What is claimed is:

1. A buckle-phone coupled with a belt, comprising:
   a mobile phone bent in a length direction of a belt to correspond to a curvature of a user's waist and including a signal terminal;
   a mobile phone support fixedly mounted to the belt and bent to correspond to the curvature of the mobile phone and the user's waist, the mobile phone support including a mobile phone accommodating section for attachably and detachably supporting the mobile phone, a front side of the mobile phone being coupled with a front side of the mobile phone support, the mobile phone support making contact with the mobile phone via the signal terminal to enable communication;
   an earphone assembly fixedly mounted to the mobile phone support adjacent to the mobile phone accommodating section, the earphone assembly being electrically connected to the mobile phone installed in the mobile phone support, the earphone assembly including an earphone, a microphone, an earphone wire connected with the mobile phone support, the earphones, and the microphone, an earphone main body installed with the earphone, and a microphone installing section installed with the microphone and extendably coupled with the earphone main body;
   an earphone accommodating section provided within the earphone assembly and including an elastic reel for winding the earphone wire to be elastically withdrawn;
   a buckle provided at the rear side of the mobile phone support and being adapted to be coupled with the belt so as to adjust the belt length to correspond to the user's waist size;
   at least one terminal contact protrusion which protrudes from the mobile phone accommodating section so as to make contact with the signal terminal, and being connected with the earphone assembly, the mobile phone being usable to communicate both when it is removed from the mobile phone support, and while it is retained in the mobile phone support by using the earphone assembly;
   an elastic member coupled to the terminal contact protrusion and enabling the terminal contact protrusion to elastically push out against the signal terminal;
   hook coupling sections provided at sides of the mobile phone; and
   hooks provided at the mobile phone accommodating section and being coupled with and released from the hook coupling sections.

* * * * *